United States Patent [19]

Katsumura

[11] Patent Number: 4,829,171
[45] Date of Patent: May 9, 1989

[54] AUTOMATIC CAMERA FOCUSING APPARATUS WITH MOVABLE POSITION SENSITIVE DETECTOR

[75] Inventor: Nobuo Katsumura, Tokyo, Japan

[73] Assignee: Konishiroku Photo Industry Co., Ltd., Tokyo, Japan

[21] Appl. No.: 90,931

[22] Filed: Aug. 31, 1987

[30] Foreign Application Priority Data

Sep. 1, 1986 [JP] Japan .................. 61-203600

[51] Int. Cl.⁴ .............................. G01J 1/20
[52] U.S. Cl. ......................... 250/201; 356/1
[58] Field of Search ...... 250/201 R, 201 PF, 201 AF, 250/204; 354/402–404; 358/227; 356/1, 4

[56] References Cited

U.S. PATENT DOCUMENTS

| 4,527,892 | 7/1985 | Yamane et al. | 250/201 AF |
| 4,561,746 | 12/1985 | Matsuda et al. | 354/403 |
| 4,566,773 | 1/1986 | Kaneda | 354/403 |
| 4,623,237 | 11/1986 | Kaneda et al. | 354/403 |
| 4,673,274 | 6/1987 | Nagaoka et al. | 354/403 |

FOREIGN PATENT DOCUMENTS 54-9054 1/1979 Japan .

Primary Examiner—David C. Nelms
Attorney, Agent, or Firm—Finnegan, Henderson, Farabow, Garrett, & Dunner

[57] ABSTRACT

An apparatus for automatically focusing a movable lens with respect to an object comprising means for projecting light on to the object, a movable light detector for receiving at an incident position light reflected from the object, a position generating circuit for generating a position signal indicating the position in the light detector of the incident position, a linking mechanism adapted to interlink the light detector and the lens to move the light detector such that when the lens is in focus with respect to the object the light reflected form the object is received at a predetermined position of the light detector and a positioning mechanism responsive to the position signal and adapted to move the lens to a position in focus with the object, the linking mechanism being responsive to the movement of the lens to the focus position to move the light detector to a position wherein the reflected light is received at the predetermined position of the light detector means.

9 Claims, 2 Drawing Sheets

AUTOMATIC CAMERA FOCUSING APPARATUS WITH MOVABLE POSITION SENSITIVE DETECTOR

FIELD OF THE INVENTION

The present invention relates to an active distance-measuring type automatic focusing apparatus.

BACKGROUND OF THE INVENTION

Recently, an automatic focusing (AF) camera has been widely used. An AF camera conventionally includes a lens shutter, a single-lens reflex camera, and an automatic focusing mechanism for measuring the distance to an object to be photographed and for moving the photographing lens to an in-focus position.

In the case of a single-lens reflex AF camera, the photographing lens is included in the distance measuring optical system and a distance measurement result can be obtained as a deviation between the actual position of the photographing lens and an in-focus position. The photographing lens of the single-lens reflex AF camera need only be moved by a distance corresponding to the deviation determined as the distance measurement result irrespective of the position of the photographing lens.

In the case of compact AF camera, the distance measuring optical system is normally independent from the photographing lens and the distance measurement result is obtaiend as a distance to an object to be photographed irrespective of the actual position of the photographing lens. In a compact AF camera, it is difficult to detect the current position of the photographing lens. Consequently, the photographing lens is actually returned to a predetermined position (initial position) before the distance to the object is measured and the lens is moved from the predetermined position to the focus position.

On the other hand, the distance measuring optical system and the photographing lens can be mechanically associated with each other in a compact camera to obtain a coincidence signal. In this case, since the entire distance range from the closest focusing distance to infinity must be examined, the photographing lens must be at the predetermined position before the distance is measured. That is, in either case, the photographing lens of the compact AF camera must first be returned to a predetermined or initial position. This initial position return operation requires that a mechanism not necessary for photographing be included in its camera. In addition to added complexity and expense, the initial position return mechanism may malfunction and cause a reliability problem.

A compact AF camera normally includes a shutter release switch comprising a double switch, and a photographing sequence is performed in the following manner. The initial depression of the shutter release switch, a first switch is turned on, distance measurement and photographing lens control operations are repeatedly performed so as to continuously follow an object to be photographed. Further depression of the shutter release switch turns on a second switch to activate the shutter. If the initial position return operation is performed in this photographing sequence, the photographing lens control time is prolonged which may actually disable contiuous following of the object and result in a very cumbersome photographing lens movement for the user.

This also applies to the case of continuous photographing wherein the distance to an object to be photographed continuously varies. If the photographing lens is moved by an amount corresponding to changes in the distance, no problem will result. However, if the initial position return operation is performed during the photographing lens movement, the photographing lens position becomes discontinuous and prolongs focusing time.

As described above, the initial position return operation of the photographing lens is not necessary for photographing and is not suitable for following changes in an object to be photographed. For this reason, Japanese Patent Publication No. 54-9054 describes a method which does not require the initial position return operation. Another method utilizes a system generally called a position control servo system.

According to the method described in Japanese Patent Publication No. 54-9054, automatic focusing is performed by driving the photographing lens by a motor associated with a distance measuring element. In this method, since the measuring element is a divided photoelectric converting element, the direction of movement to a focused position and the focus condition can both be detected, thus, eliminating useless movement. Since the out-of-focus amount, i.e., a deviation is unknown, focusing cannot be performed only with the measurement results, so that repeated or conntinuous distance measurement is required.

In addition, in a method wherein a photographing lens driving motor is stopped when focusing is completed by the continuous distance measurement, a photographing lens must be returned along the opposite direction because the motor overruns the focused position. This operation is repeated to control the photographing lens. Therefore, a "hunting" phenomenon sometimes occurs. In order to prevent this phenomenon, the photographing lens must be moved at low speed or a mechanism must be provided to hold the photographing lens when it reaches a target position, so that the method is not suitable for a compact camera that requires rapid photographing lens movement during continuous photographing.

Another method that does not require the initial position return operation of the photographing lens combines the active distance measuring method and the photographing lens position control servo system. The position control servo system of this method can be simply constituted by using a photographing lens driving motor and a potentiometer for detecting a position of the photographing lens. However, it is difficult to adopt this method to a compact camera because a potentiometer as a position detector is not small in size and is expensive.

Furthermore, an absolute detection code pattern may be used as a position detector. However, a high-resolution and absolute-valueu code type code pattern is complex and the pattern itself is large, and hence is not suitable for a compact camera.

SUMMARY OF THE INVENTION

The present invention has made in consideration of the above situation, and it is an object of the present invention to realize a high speed photographing lens control operation that does not require an initial position return operation of a photographing lens in a compact camera with a simple arrangement.

This and other objects are attained by an apparatus for automatically focusing a movable lens with respect to an object comprising means for projecting light on the object, movable light detector means for receiving at an incident position light reflected from the object, means for generating a position signal indicating the position in the light detector means for the incident position, linking means adapted to interlink the light detector means and the lens to move the light detector means such that when the lens is in focus with respect to the object the light reflected from the object is received at a predetermined position of the light detector means, and positioning means response to the position signal and adapted to move the lens to a position in focus with the object, the linking means beignn responsive to the movement of the lens to the focus position to move the light detector means to a position wherein the reflected light is received at the predetermined position of the light detector means.

BRIEF DESCRIPTION OF THE DRAWINGS

The manner by which the above objects and other objects features, and advantages of the present invention are attained will become fully apparent from the following detailed description when it is considered in view of the drawings, wherein:

FIG. 3 is a schematic view for explaining a distance measuring principle using a position sensitive device.

DETAILED DESCRIPTION

The present invention will now be described in detail with reference to the accompanying drawigns.

Figure 1:
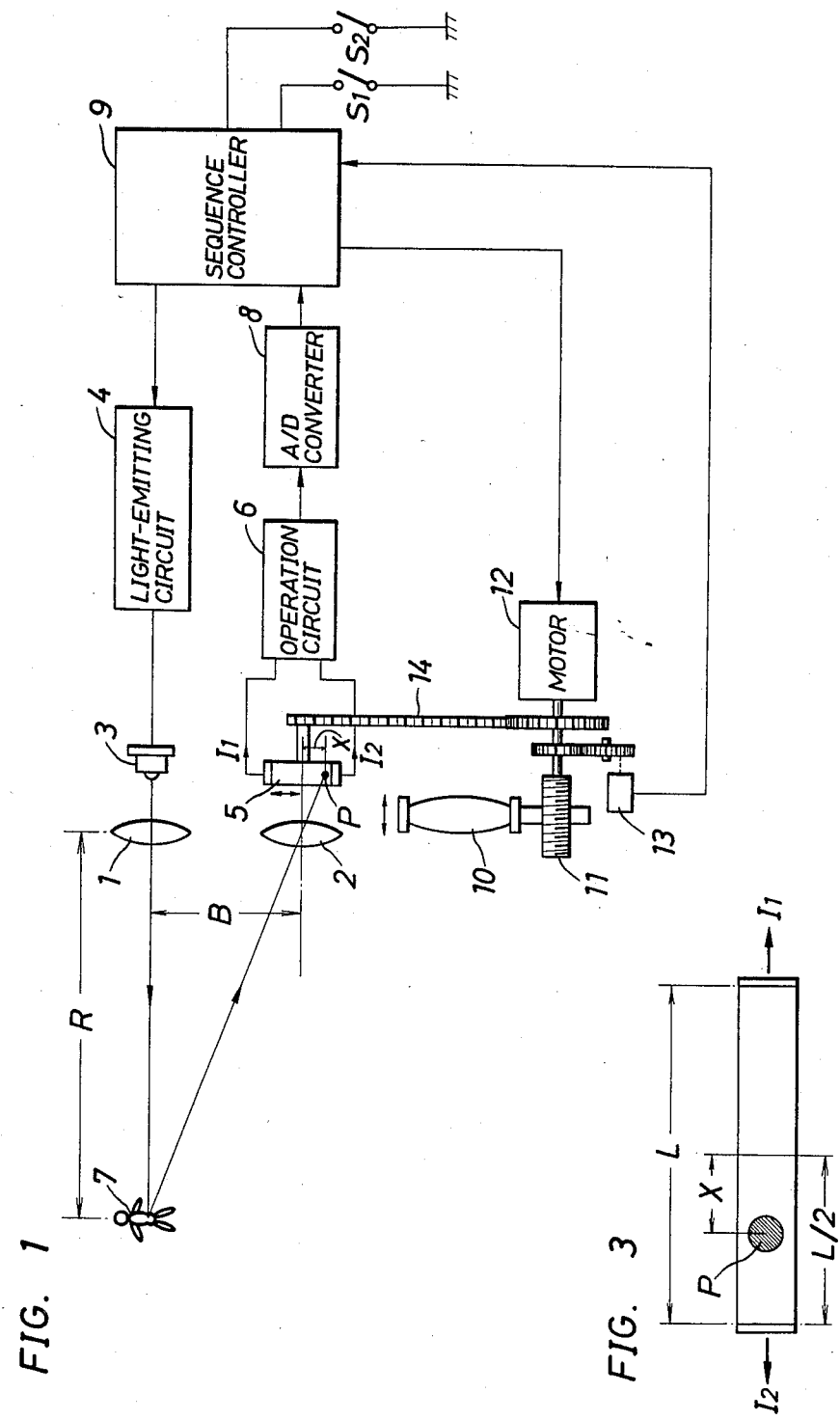
FIG. 1 is a schematic view showing a basic circuit configuration of an automatic focusing camera according to the present invention.

FIG. 1 is a schematic view showing a basic circuit configuration of an active distance measuring type automatic focusing camera according to the present invention.

In FIG. 1, a light-emitting lens 1 projects light onto an object. A light-receiving lens 2 receives light reflected from the object. An infrared light-emitting LED 3 is controlled by a light-emitting circuit 4 to emit infrared light at predetermined times, and a light detecting element 5, that is movable along a direction represented by a arrow is also provided to detect the infra-red light. An operation circuit 6 for calculating the distance between a predetermined position of the light detecting elements and an incident position of the light detecting element in accordance with an output current from the light detecting element, an A/D converter 8 or digitizing the calculated distance, and a sequence controller 9 including a microcomputer and serving as a center of a control system are also included in the camera. The camera also comprises photographing lens 10 movable along an optical axis direction, a drive mechanism 11 consisting of gears and the like for driving the photographing lens 10 along the optical axis direction, a motor 12, and a rotary encoder 13 for detecting the rotational position or number of the motoro 12.

The light detecting element 5 is generally called a PSD (Position Sensitive Device). When a spot image P is incident on the surface of the element, as shown in FIG. 3, two current outputs I₁ and I₂ can be obtained from the element. Assuming that the distance from the center of the element surface to the spot image P is x, the relationship between the distance x and the currents I₁ and I₂ is as follows:

$$x = K_1 \cdot \ln(I_1/I_2)$$

where $K_1$ is a constant.

Assuming that an image of an object at an infinite position is imaged onto the center of the light detecting element 5 and the photographing lens 10 is set to focus on the infinite position, and then the light-emitting lens 1 projects light onto the object 7 at a finite distance, the reflected light of the spot image is imaged onto a position on the light detecting element 5 separated from the center by the distance x.

In this case, the relationship between a distance R to the object 7 and the distance x is as follows:

$$R = B \cdot f_2 / X$$

where B is a distance (base length) between the optical axis of the light-emitting lens 1 and the light-receiving lens 2, and $f_2$ is a focal length of the light-receiving lens 2 (FIG. 1).

On the other hand, assuming that a position of the photographing lens 10 on the optical axis when the photographing lens 10 is focused at infinity is an origin position and that the position of the photographing lens 10 is y when the lens is focused on a position at a distance R, then Y represents a defocusing amount and has the relation $R = K_2 \cdot 1/y$.

Therefore, the relationship between x and y is $y = K_3 \cdot x$, so that currents $I_1$ and $I_2$ of the light detecting element 5 are calculated to obtain x and hence the defocusing amount y ($K_2$, $K_3$ being constants).

Figure 2:
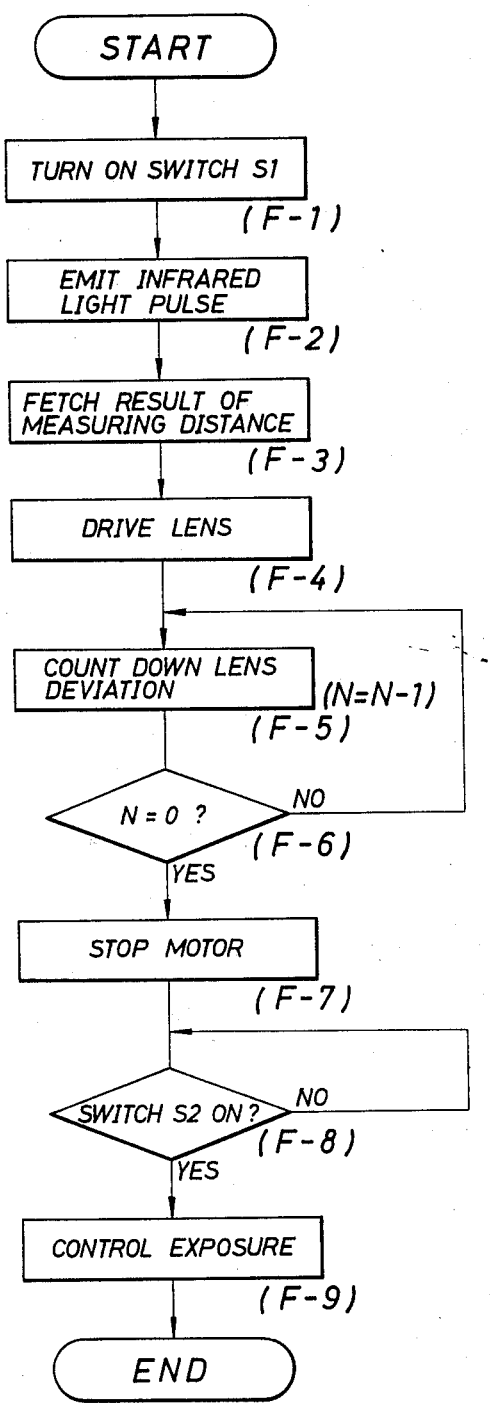
FIG. 2 is a flow chart showing a distance measuring operation according to the present invention.

Note that a rack-and-pinion mechanism 14 is used to link the light detecting element 5 and the photographing lens 10, and its speed change ratio is set to be $K_3$ to obtain a predetermined operation. An automatic focusing operation will be described below with reference to FIG. 1 and the flow chart of FIG. 2. Note that in FIGS. 1 and 2, reference symbols $S_1$ and $S_2$ denote switches that are turned on by operating a release button. The switch $S_1$ is turned on in a first step when the release button is slightly depressed. The switch $S_2$ is turned on when the release button is further depressed in a second step.

When a photographer slightly depresses the release button in the first step, the switch $S_1$ is turned on (F - 1), and the light-emitting circuit 4 emits infrared light pulses in accordance with a light-emission instruction from the sequence controller 9 (F - 2). The infrared light pulses are radiated forward through the light-emitting lens 1, reflected by the object 7, and then received by the light detecting element 5 through the light-receiving lens 2.

The measurement result (which corresponds to the distance x) calculated by the operation circuit 6 is digitized by the A/D converter 8 and fetched by the microcomputer constituting the sequence controller 9 (F - 3). The measurement result is set as the defocusing amount N.

When the fetched distance x is not 0, the sequence controller 9 outputs a rotation instruction signal to rotate the motor 12 so as to move the photographing lens 10 along the optical axis direction through the drive mechanism 11 (F - 4), and at the same time, the light detecting element 5 is moved by the rack-and-pinion mechanism 14 in a direction represented by an arrow. In this case, the moving direction of the photographing lens 10, and hence a moving direction and a moving amount of the distance measuring element 5 can be determined by the calculating distance x.

The moving amount of the photographing lens 10 is detected by the rotary encoder 13 provided on a rotation shaft of the motor 12, and the sequence controller 9 counts down the defocusing amount N one by one with respect to the predetermined moving amount ($N=N-1$) (F - 6). The photographing lens 10 is continuously moved until the defocusing amount N becomes 0 (F - 5), and when $N=0$, the sequence controller 9 outputs a motor stop signal to stop the motor 12 (F - 7). At this time, the reflected infrared light pulses from the object 7 are received at the center of the light pulses from the object 7 are received at the center of the light detecting element 5, so that $x=0$. In this state, the photographing lens 10 focuses on the object 7 at the distance $R_1$.

Then, assuming that the camera is directed to another object to be photographed (at a distance $R_2$) or the object 7 moves to change the distance from $R_1$ to $R_2$, the point at which the reflected infrared light pulses from the object are received is deviated from the center again, i.e., $x \neq 0$. Therefore, operations from step (F -1) to step (F - 7) are repeated so that the photographing lens 10 is moved to, and stopped at, a position corresponding to the new distance $R_2$. In this state, the photographing lens 10 focuses on the new object to be photographed.

Thereafter, when the release button is further depressed in a second step (F-8), exposure control is performed (F -9), and then a film is advanced to complete the operations.

In the above embodiment, the light detecting element is moved so that the reflected infrared light pulses from the object to be photographed are received at the center of the light detecting element. However, the light-receiving point is not limited to the center, but may be any predetermined point, e.g., an edge of the distance measuring element.

In addition, the rotary encoder 13 is used as a detecting device in the above embodiment. However, a code pattern having a simple repetition pattern may be used instead of the rotary encoder 13 to obtain an apparatus which is small in size, inexpensive, and hence suitable for a compact camera.

According to the present invention, since a deviation between a position of a photographing lens and an in-focus position can be measured by interlinking the photographing lens and a light detecting element, the photographing lens need not be returned to its initial position. In addition, since a deviation can be obtained by one measurement, the lens can be controlled at high speed, thereby providing an automatic focusing apparatus suitable for high speed continuous photographing or for photographing a moving object.

Furthermore, a large distance measuring element is required to reduce a close focusing distance of a distance measuring range in a normal active type distance measuring system. However, according to the present invention, since the light detecting element is moved so as to follow the reflected light, the close focusing distance of the distance measuring range can be reduced without enlarging the element.

What is claimed is:

1. An apparatus for automatically focusing a movable lens with respect to an object, the apparatus comprising:

(a) a light projecting unit including means for emitting light and means for projecting the light to the object;

(b) a movable position sensitive device for receiving the light reflected from the object and providing a first signal and a second signal indicative of an incident position of light falling on the position sensitive device, said movable position sensitive device including a first side and a second side disposed on opposite sides of a predetermined position, said first and second signals being generated by said first and second side of said movable position sensitive device, respectively, to indicate on which of said first and second side said incident position falls and to indicate the distance between said incident position and said predetermined position;

(c) generating means for receiving said first and second signals and generating a position signal in response thereto, said position signal being indicative of which of said first or second sides said incident position falls on and the distance between said incident position and said predetermined position;

(d) positioning means, responsive to said position signal, for moving the moveable lens by an amount and in a direction proportional to the position signal to place the moveable lens in a desired focus condition; and (e) means for moving said position sensitive device in interlocking relation with said movable lens such that when the movable lens is moved by the distance depending upon said position signal, said position sensitive device is moved a proportional amount.

2. The apparatus as claimed in claim 1, wherein said positioning means has a position change ratio set equal to $K_3$, where $K_3=y/x$ and $x=$ the distance from the center position to the incident position and $y=$ the amount the moveable lens is defocused.

3. An apparatus according to claim 1, further including a motor adapted to drive the lens in the direction of focus thereof and wherein said positioning means includes motor driving means responsive to said position signal for outputting a drive signal to control said motor to move the lens in the focal direction thereof by a correction distance corresponding to the distance between said incident position and said predetermined position and sufficient to focus the lens on the object.

4. An apparatus according to claim 1, further including a motor adapted to drive the lens in the direction of focus thereof, and wherein said positioning means includes motor driving means for outputting a motor drive signal responsive to said position signal to control said motor to drive the lens to correct the focal deviation thereof.

5. An apparatus according to claim 4, further including a lens movement detector adapted to detect the amount of movement of the lens and for supplying a corresponding lens movement signal to said motor driving means to discontinue said motor drive signal when said lens movement signal indicates that said lens has been moved a sufficient amount to be in focus with the object.

6. An apparatus according to claim 3 or 4, further including a switch for initiating projection of said light by said projecting means.

7. An apparatus according to claim 6, wherein said light detector means includes a position sensitive device.

8. An apparatus according to claim 5, wherein said lens movement detector comprises a rotary encoder.

9. An apparatus according to claims 1, 3 or 4, wherein said linking means comprises a rack and pinion assembly adapted to move the lens and said light detector means by corresponding amounts in perpendicular directions.

* * * * *